(12) United States Patent
Woolmer (10) Patent No.: US 10,566,866 B2
(45) Date of Patent: Feb. 18, 2020

(54) ASYMMETRIC AXIAL PERMANENT MAGNET MACHINES HAVING AXIAL ROTORS WITH IRREGULAR MAGNETS

(71) Applicant: Yasa Motors Limited, Oxfordshire (GB)

(72) Inventor: Tim Woolmer, Oxfordshire (GB)

(73) Assignee: Yasa Motors Limited, Oxfordshire (GB)

( * ) Notice: Subject to any disclaimer, the term of this patent is extended or adjusted under 35 U.S.C. 154(b) by 0 days.

(21) Appl. No.: 14/632,502

(22) Filed: Feb. 26, 2015

(65) Prior Publication Data

US 2015/0244219 A1 Aug. 27, 2015

(30) Foreign Application Priority Data

Feb. 26, 2014 (GB) .................................. 1403371.6

(51) Int. Cl.
*H02K 1/27* (2006.01)
*H02K 21/24* (2006.01)
*H02K 29/03* (2006.01)

(52) U.S. Cl.
CPC ........... *H02K 1/2793* (2013.01); *H02K 21/24* (2013.01); *H02K 29/03* (2013.01)

(58) Field of Classification Search
CPC ...... H02K 21/24; H02K 1/2793; H02K 16/02; H02K 29/03; H02K 37/08

(Continued)

(56) References Cited

U.S. PATENT DOCUMENTS 5,440,185 A * 8/1995 Allwine, Jr. ............. G01B 7/30
310/114
6,335,582 B1 * 1/2002 Abukawa ............... H02K 1/146
310/156.38

(Continued)

FOREIGN PATENT DOCUMENTS

CN 202004600 10/2011
EP 2824812 1/2015

(Continued)

OTHER PUBLICATIONS

Partial Search Report for GB Patent Application No. 1403371.6, dated May 6, 2016.

(Continued)

*Primary Examiner* — Jermele M Hollington
*Assistant Examiner* — Maged M Almawri
(74) *Attorney, Agent, or Firm* — Meunier Carlin & Curfman LLC (57) ABSTRACT

A rotor for an axial flux permanent magnet machine is described. The machine has a stator comprising a stator housing enclosing a set of coils wound on stator bars or teeth and disposed circumferentially at intervals about an axis on the machine, and a rotor bearing a set of permanent magnets and mounted for rotation about the said axis. The rotor and stator are spaced apart along said axis to define a gap therebetween in which magnet flux in the machine is generally in an axial direction. The magnets are disposed circumferentially around said rotor and define a plurality, n, of matching sets of magnets. Each set of magnets includes a plurality of magnets, wherein said n sets of magnets on said rotor have n-fold rotational symmetry. Within a said set, the magnets have different shapes and/or relative circumferential spacings of adjacent magnets within the set of magnets are irregular.

16 Claims, 5 Drawing Sheets

(58) Field of Classification Search
USPC .............. 310/156.32–156.47, 156.25, 49.32
See application file for complete search history.

(56) References Cited

U.S. PATENT DOCUMENTS

| | | | | | |
|---|---|---|---|---|---|
| 6,762,525 | B1* | 7/2004 | Maslov | ................... | H02K 1/182 |
| | | | | | 310/112 |
| 8,304,949 | B2* | 11/2012 | Yamamoto | ........... | H02K 1/2793 |
| | | | | | 310/156.38 |
| 8,397,369 | B2* | 3/2013 | Smith | ................... | H02K 1/2766 |
| | | | | | 29/596 |
| 8,821,365 | B2* | 9/2014 | Ozaki | ................... | F04D 13/0666 |
| | | | | | 600/16 |
| 2006/0033393 | A1 | 2/2006 | Ritchey | | |
| 2006/0284507 | A1* | 12/2006 | Murakami | ........... | H02K 1/2793 |
| | | | | | 310/156.37 |
| 2007/0046124 | A1* | 3/2007 | Aydin | ................... | H02K 21/24 |
| | | | | | 310/156.37 |
| 2010/0090553 | A1* | 4/2010 | Ritchey | ................... | H02K 16/00 |
| | | | | | 310/114 |
| 2010/0148611 | A1* | 6/2010 | Wang | ................... | H02K 1/14 |
| | | | | | 310/156.37 |
| 2010/0156227 | A1* | 6/2010 | Hung | ................... | H02K 21/16 |
| | | | | | 310/156.38 |
| 2010/0253085 | A1* | 10/2010 | Minowa | ................... | H02K 21/24 |
| | | | | | 290/55 |
| 2012/0104880 | A1* | 5/2012 | Takemoto | ............. | H02K 21/24 |
| | | | | | 310/44 |
| 2012/0262020 | A1* | 10/2012 | Smith | ................... | H02K 1/2766 |
| | | | | | 310/156.07 |
| 2013/0009406 | A1* | 1/2013 | Ireland | ................... | H02K 1/182 |
| | | | | | 290/55 |

FOREIGN PATENT DOCUMENTS

| | | |
|---|---|---|
| GB | 2341732 | 11/1998 |
| JP | S6430444 | 2/1989 |

OTHER PUBLICATIONS

International Search Report for Great Britain Application No. 1403371.6 dated Aug. 26, 2015.

* cited by examiner

ASYMMETRIC AXIAL PERMANENT MAGNET MACHINES HAVING AXIAL ROTORS WITH IRREGULAR MAGNETS

CROSS REFERENCE TO RELATED APPLICATIONS

This application claims priority to GB Patent Application No. 1403371.6 filed Feb. 26, 2014, the contents of all of which are hereby incorporated herein by reference in their entirety.

FIELD OF THE INVENTION

This invention relates to techniques for reducing cogging, and for shaping the back emf, in axial flux permanent magnet machines.

BACKGROUND TO THE INVENTION

Figure 1A:
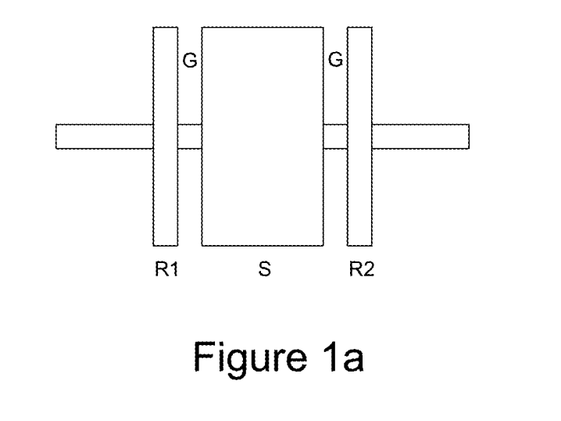
FIGS. 1a to 1c show, respectively, a general configuration of a two-rotor axial flux machine, example topologies for axial flux permanent magnet machines, and a schematic side view of a yokeless and segmented armature (YASA) machine.

In this specification we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine with a pair of rotors R1, R2 to either side of a stator S—although a simple structure could omit one of the rotors. As can be seen there is an air gap G between a rotor and a stator and in an axial flux machine the direction of flux through the air gap is substantially axial.

Figure 1B:
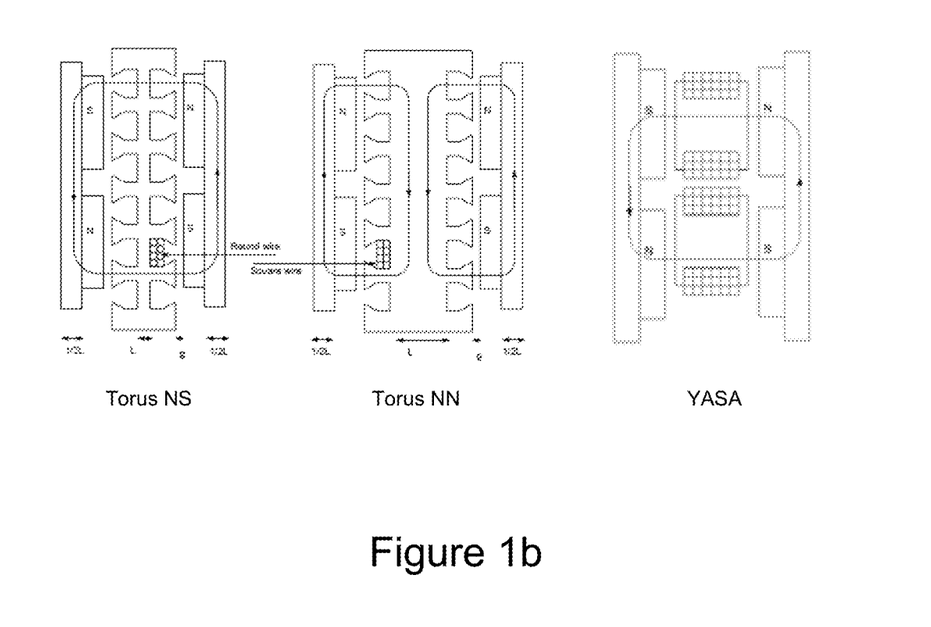

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but one drawback is loss of a route for heat to escape from stator coils. Thus preferably coolant for the machine is circulated through the stator housing.

We have previously described, in WO2012/022974, a clamshell type stator housing. Advantageously shoes of the stator bars on which the stator coils are wound are over-moulded into the radial wall of the housing. Thus the housing provides both structural strength and a coolant chamber.

Figure 1C:
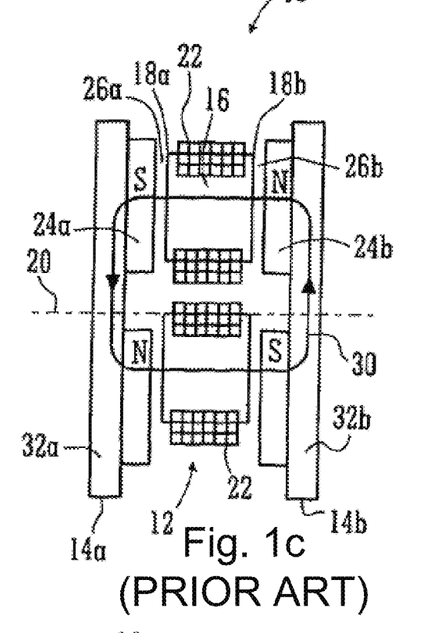
Figure 2:
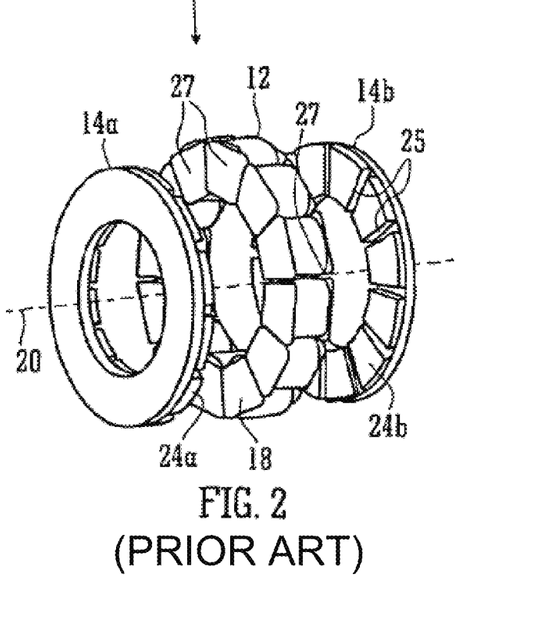
FIG. 2 shows a perspective view of the YASA machine of FIG. 1c.
Figure 3:
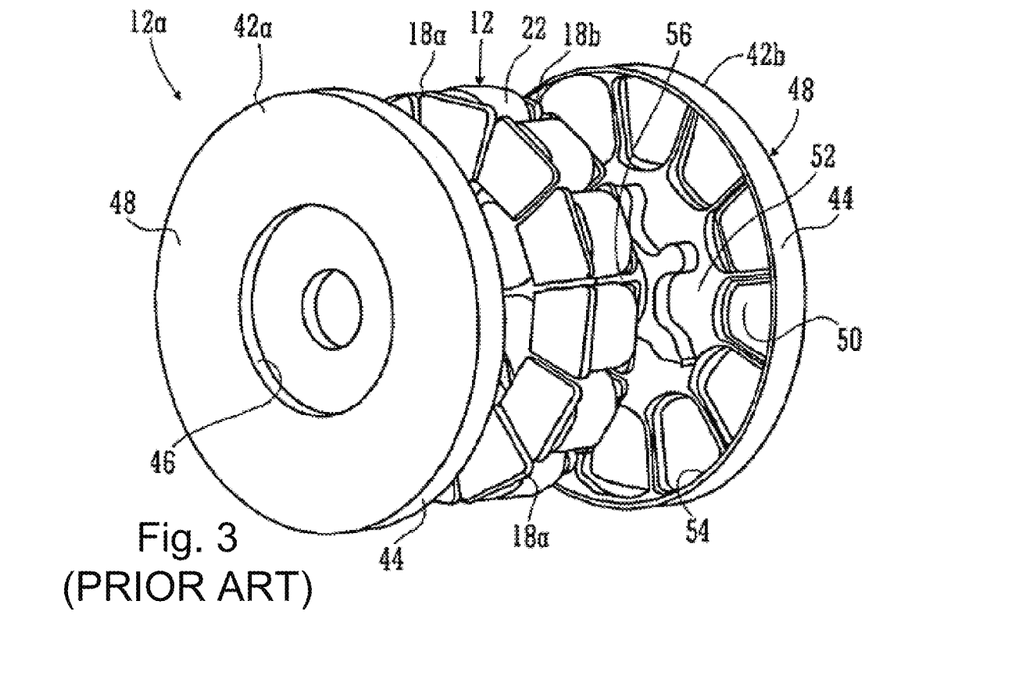
FIG. 3 shows a perspective exploded view of a stator and stator housing for a YASA machine according to the prior art.

Referring first to FIGS. 1c, 2 and 3, which are taken from our PCT application WO2012/022974, FIG. 1c shows a schematic illustration of a yokeless and segmented armature machine 10. The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22. In the alternative arrangements non-YASA topologies of FIG. 1b the stator coils are wound around one or more stator teeth whereas in the YASA topology of FIG. 1c they are wound around respective stator bars.

The two rotors 14a,b carry permanent magnets 24a, b that face one another with the stators coil 22 between (when the stator bars are inclined—not as shown—the magnets are likewise). Two air gaps 26a,b are disposed between respective shoe and magnet pairs 18a/24a, 18b/24b.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastics material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils defining a cooling chamber within the housing through which coolant is pumped.

In a typical machine an even number of coils (divisible by 3 for a 3 phase machine) and an even number of magnets is spaced around the axis of rotation 20. In addition there are different numbers of coils and magnets, so that the coils do not all come into registration with the corresponding magnet pair at the same time and at the same rotational position of the rotor with respect to the stator. This serves to reduce cogging torque and benefits continuous torque creation. However further improvements in cogging reduction are desirable. In addition similar considerations to those which affect cogging also affect the shape of the back emf of a motor and it is generally desirable to make the back emf as sinusoidal as practicable, thus reducing the total harmonic distortion of the machine. General background prior art can be found in US2011/309706.

SUMMARY OF THE INVENTION

According to one aspect of the present invention there is therefore provided a rotor for an axial flux permanent magnet machine, the machine having a stator comprising a stator housing enclosing a set of coils wound on stator bars or teeth and disposed circumferentially at intervals about an axis on the machine, and a rotor bearing a set of permanent magnets and mounted for rotation about the said axis, and wherein said rotor and stator are spaced apart along said axis to define a gap therebetween in which magnet flux in the machine is generally in an axial direction, wherein said magnets are disposed circumferentially around said rotor, wherein said magnets define a plurality, n, of matching sets of magnets, each set of magnets comprising a plurality of magnets, wherein said n sets of magnets on said rotor have n-fold rotational symmetry, and wherein within a said set the magnets have different shapes and/or wherein within a said set relative circumferential spacings of adjacent magnets within the set of magnets are irregular.

Although employing different numbers of poles and magnets helps to reduce cogging such an arrangement still has a number of relatively lower energy states at certain angular positions of the rotor within a rotation. The inventors have recognized that the cogging torque can be further reduced, and the back emf made more sinusoidal, by employing an arrangement of magnets which has n-fold symmetry but which is 'asymmetric' within an n-fold segment. In some preferred embodiments the axial flux permanent magnet machine has a YASA topology.

Employing greater than two-fold symmetry is advantageous for reducing vibration, as explained in more detail later. Employing four-fold symmetry is particularly advantageous—although three-fold symmetry can be used, four-fold symmetry is better and whilst in principle higher symmetries can be employed in practice this becomes difficult unless the number of magnets is large. Thus in some preferred embodiments the rotor is notionally divided into quadrants in which one quadrant matches another (in embodiments, all the quadrants match). However within a quadrant the angular positions of the magnets are not regularly spaced—the magnets are displaced from the positions at which they would lie were the magnets spaced at regular intervals of 360/N where N is the total number of magnets.

In one design methodology the magnets are first positioned at regular intervals around the rotor and then within each quadrant pairs of magnets are displaced from these regular positions; preferably the displacement is the same in all n, for example 4 segments. The rationale behind this is that around a rotor magnets are arranged in north-south pairs and a more rational approach to cogging reduction is taken when a north-south pair of rotor magnets is displaced rather than just placing each magnet individually. Nonetheless in practice the design approach involves iteratively adjusting magnetic positions and then modeling the motor to determine the level of cogging torque and/or back emf shape—and thus in principle there is no requirement to move magnets in pairs (or in north-south pairs). However, taking this approach appears to enable more rapid convergence to an optimal arrangement (as determined, in effect, by computer aided design experiment), as well as helping to keep the back EMF balanced between the phases in a three-phase machine. Experimentally it has been determined that a design approach which provides good reduction in cogging torque is to displace adjacent north-south pairs of magnets towards one another within a segment (quadrant), away from their regularly spaced positions.

Although preferred approaches to anti-cogging involve moving the magnets away from regularly spaced positions around the rotor, additionally or alternatively a similar result may be obtained by changing the shape and/or strength of the magnets around the rotor, in particular retaining n-fold rotational symmetry as previously described. Thus, for example, rather than displacing a magnet or a pair of magnets the shape of the magnet may be changed, say, by chamfering one or more edges. A similar design methodology can be employed to reduce cogging torque and improve back emf shape with such an approach. However in practice this approach is potentially less desirable because of the increased cost of fabricating magnets of different shapes. Nonetheless, depending upon the degree to which magnets are moved relative to one another in the previously described approach it may be necessary to chamfer one or more of the magnets where they are physically close, to avoid them interfering with one another.

Experimentally it has been determined that certain ratios of magnets to pole pieces are more advantageous than others for motor performance. In particular, a ratio of (number of pole pieces):(number of magnets) of 3:2 has been found to be particularly advantageous. Example axial flux motors of this type may have a 12/8, 18/12, 24/16 or 30/20 poles/magnets configuration (although this configuration has a very high level of symmetry—for example 8 fold symmetry in a 24/16 configuration). Such an approach is also convenient for manufacture since three adjacent pole pieces may be provided, one for each of three different phases of a three phase power supply for a motor (or equivalently arranged in a generator). This facilitates interconnection of windings and improves manufacturability and power density. Another potentially useful ratio of (number of pole pieces):(number of magnets) is 6:5, in particular for motors with high numbers of poles, for example above 24 poles.

It is easier to appreciate advantages of the described arrangements when they are considered in terms of cogging than when they are considered in terms of the shape of the back emf. However, as the rotor sweeps over the pole pieces one effect is to generate harmonics in the back emf, and by reducing the symmetry these harmonics can also be reduced. This is advantageous when generating power and, conversely, for a motor makes the motor easier to drive.

In some preferred embodiments the axial flux machine has a pair of rotors both driven by the same set of stator coils. In this case the cogging/back emf harmonics can be reduced still further by twisting one rotor relative to another, for example by a twist in the range 0.1° to 20° or 1° to 10°.

Although the optimum cogging reduction can be achieved with an irregular arrangement of rotor magnets as previously described, some benefit can be obtained merely by twisting one rotor with respect to another in a dual rotor machine. However in practice experiments have demonstrated that there is an additional constraint which a machine of significant speed/power should satisfy: experiments with a 12/10 motor resulted in a resonant condition in which, during rotation, the interaction between the poles and magnets results rotor being bent in a manner which resembles a hyperbolic parabaloid during rotation. The bending action can create significant acoustic noise/vibration if a resonant frequency condition is met. This can be avoided, as explained in more detail later, by employing a force profile—that is, a variation of (axial) force on the rotor with axial angle—which has greater than 2-fold symmetry. This can conveniently be achieved by employing a rotor which has greater than 2-fold symmetry (in this respect the windings, which may for example be three-phase, can be disregarded).

In some preferred embodiments of the above described aspect of the invention, therefore, the force profile on a rotor, and in embodiments the or each rotor, has greater than 2-fold rotational symmetry.

According to a further aspect of the invention there is therefore also provided a double rotor axial flux permanent magnet machine, the machine comprising: a stator comprising a stator housing enclosing a set of coils wound on respective stator bars and disposed circumferentially at intervals about an axis on the machine; a pair of rotors supported for rotation on common mount; each said rotor bearing a set of permanent magnets and mounted for rotation about the said axis, wherein a said rotor and said stator are spaced apart along said axis to define a gap therebetween in which magnet flux in the machine is generally in an axial direction, wherein each said rotor has the same pattern of magnets and wherein, for each rotor, said magnets are disposed circumferentially around said rotor, wherein said magnets define a plurality, n, of matching sets of magnets, each set of magnets comprising a plurality of magnets, wherein said n sets of magnets on said rotor have n-fold rotational symmetry; wherein one of said rotors is twisted relative to the other; and wherein each of said rotors has greater than 2-fold rotational symmetry or has a variation of axial force on the rotor with axial angle with greater than 2-fold rotational symmetry.

In some preferred embodiments the rotors are twisted by a (mechanical) angle of between 0.1 degrees and 10 degrees, more particularly between 1 degree and 10 degrees, for example in embodiments around 3 degrees. The optimum twist angle (which may be determined as an angle which minimizes cogging for a particular machine) depends in part on the number of poles—it is smaller for many poles than in motors with just a few poles.

In embodiments of the machines of the above described aspects of the invention the magnets are preferably mounted on a backplate of magnetic material. Preferably the backplate is then laminated, but laminating the backplate reduces its strength. Thus in preferred implementations the backplate comprises a laminated region held on or within a cavity of a steel support. For example the laminated region may comprise a spirally wound ribbon of wire defining a disc, the width of the ribbon defining the thickness of the disc. This may then be mounted on or within a magnetic metal supporting plate, for example in a cup or cavity of a steel backplate.

Thus in a further related aspect the invention provides an axial flux permanent magnet machine, the machine having a stator comprising a stator housing enclosing a set of coils wound on respective stator bars and disposed circumferentially at intervals about an axis on the machine, and a rotor bearing a set of permanent magnets and mounted for rotation about the said axis, and wherein said rotor and stator are spaced apart along said axis to define a gap therebetween in which magnet flux in the machine is generally in an axial direction, wherein said magnets are mounted on a backplate of magnetic material, wherein said backplate comprises a laminated region held on or within a solid support.

The invention also provides a method of reducing cogging in an axial flux permanent magnet machine, the method comprising employing a rotor with N magnets having a n-fold rotational symmetry wherein, within each of n symmetric segments of the rotor, at least some of the magnets are displaced away from regularly spaced portions separated by (360/N) degrees.

In a related aspect the invention provides a method shaping back emf in an axial flux permanent machine motor, the method comprising employing a rotor with N magnets having a n-fold rotational symmetry wherein, within each of n symmetric segments of the rotor, at least some of the magnets are displaced away from regularly spaced portions separated by (360/N) degrees.

The inventors have recognized that not only does such a method reduce cogging as previously described, but it can also be employed to shape the back emf of a motor, in particular so that the back emf is as sinusoidal as possible.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 4A:
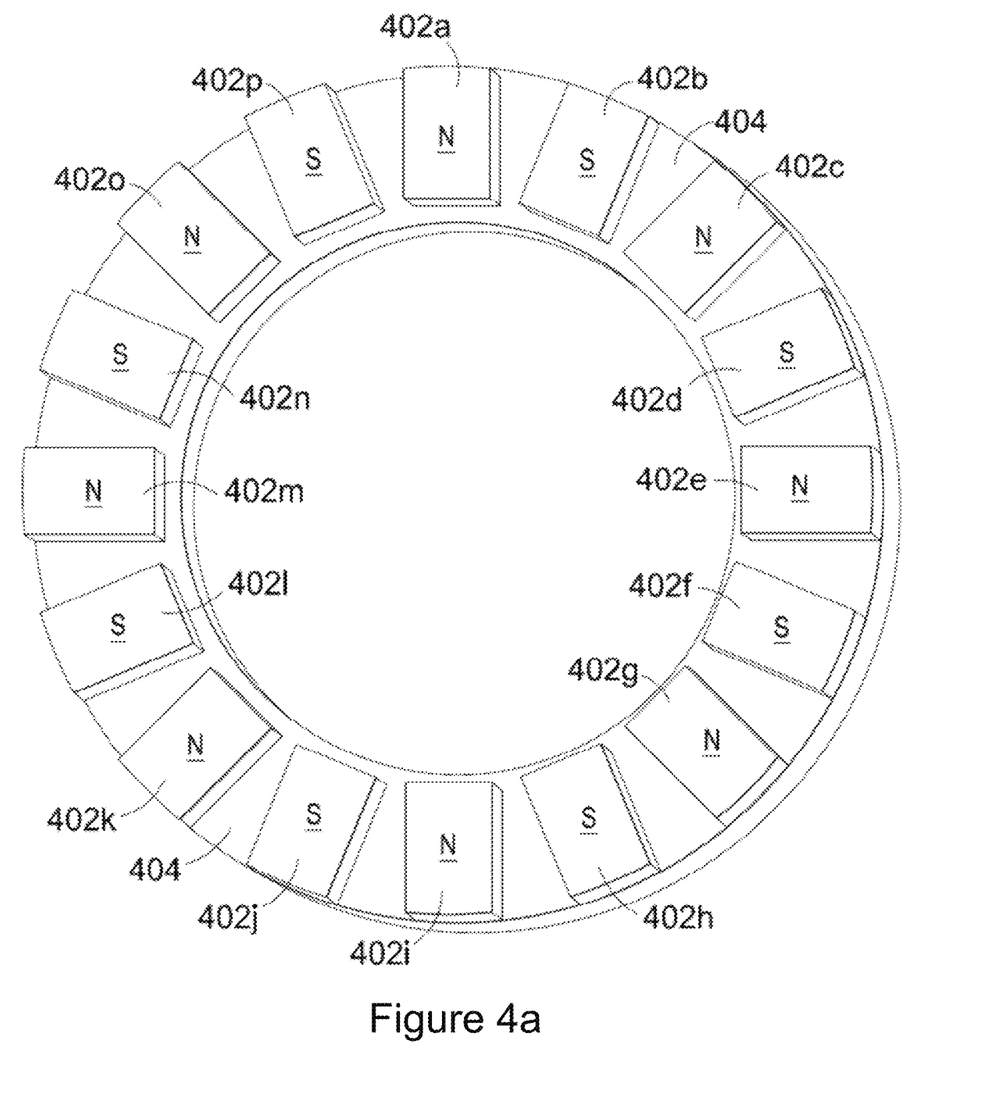
FIGS. 4a to 4c show successive stages in the design of an asymmetric rotor according to an embodiment of the invention.

Referring to FIG. 4a this shows a first stage in design of an asymmetric rotor 400 according to an embodiment of the invention. In the illustrated example the rotor has 16 magnets 402 and is preferably employed with a stator having 24 poles. The magnets 402 are mounted on a backplate 404 which, in the illustrated example, has a ring shape. In general, however, the shape of the backplate is not critical and may depend, for example, on the driver arrangement from/to the rotor—in other arrangements, for example, the backplate 404 may be disc-shaped.

As illustrated in FIG. 4a the magnets 402 are arranged with alternating north 402a and south 402b pole faces and, at this stage in the design process, the magnets are spaced circumferentially at regular intervals around the backplate 404.

Figure 4B:
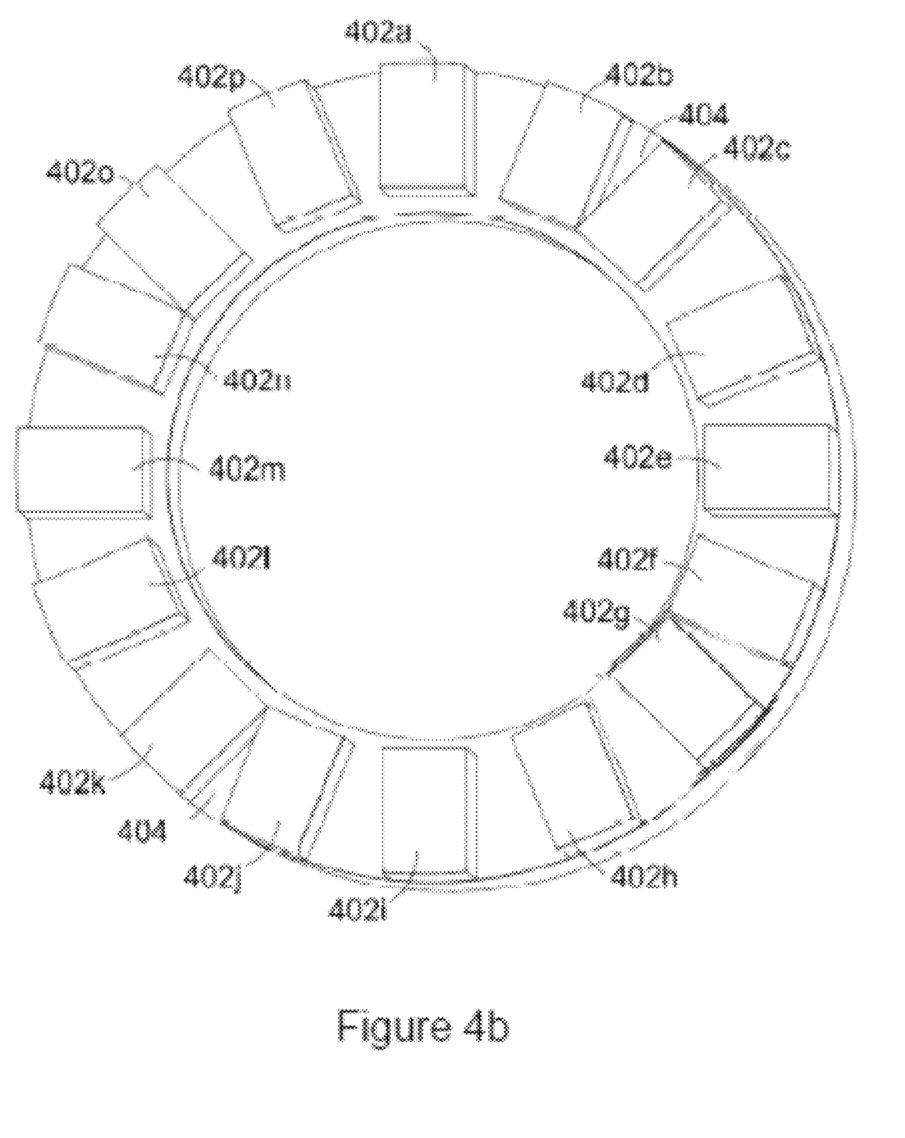

As illustrated in FIG. 4a the rotor has 8-fold symmetry. In FIG. 4b this symmetry has been broken by a pairwise displacement of the rotor magnets from their regularly spaced positions. In particular the rotor has been notionally divided into four quadrants, to retain 4-fold symmetry and within each quadrant a first pair of magnets 402a,b and a second pair of magnets 402c,d have each been displaced, in the illustrated example towards one another. In embodiments the same displacements are made in each of the four segments of the 4-fold symmetric arrangement. Thus the pairs of magnets 402e,f and 402g,h have been displaced towards one another; the pairs of magnets 402i,j and 402k,l have been displaced towards one another; and the pairs of magnets 402m,n and 402o,p have been displaced towards one another. Although an example with 4-fold symmetry has been described the skilled person will readily appreciate that corresponding techniques may be employed for n-fold symmetry.

The result of the displacement of the magnets from their regularly spaced positions is that the rotor retains 4-fold (or n-fold) symmetry but that the magnets are not regularly spaced within each of the 4- (or n-) fold segments. Displacing the magnets in this way has the effect of reducing the cogging torque because the depths of the energy minima at different angular rotational positions of the rotor with respect to the stator can be reduced. It will be appreciated that the precise locations of the magnets with respect to the poles (stator shoes) of the stator will vary from machine to machine. However, by adding one or more extra degrees of design freedom as described the magnet positions can be adjusted for any given machine, for example using electromagnetic design software such as Vector Fields from Cobham plc to minimise the cogging. In embodiments displacing the magnets as described can achieve a reduction in cogging by a factor of 4 or 5, for example down to less than 10 Nm, less than 5 Nm and further.

As can be seen in FIG. 4b one result of displacing the magnets circumferentially is that adjacent magnets can interfere with one another—shown for example by magnets 402b,c. A template can be used to define a minimum spacing between the magnets 402, for example by imposing the template on the magnet arrangement to to define a modified shape for the magnets where they abut or overlap. Thus in the illustrated example magnets 402b and 402c each have a chamfered corner. This assists manufacturability of the rotor. Optionally all the magnets on the rotor may be chamfered so that a single shape of magnet may be employed; alternatively some magnets may be chamfered and others left with an unmodified pole shape, for example a generally rectangular or wedge-shape.

Figure 4C:
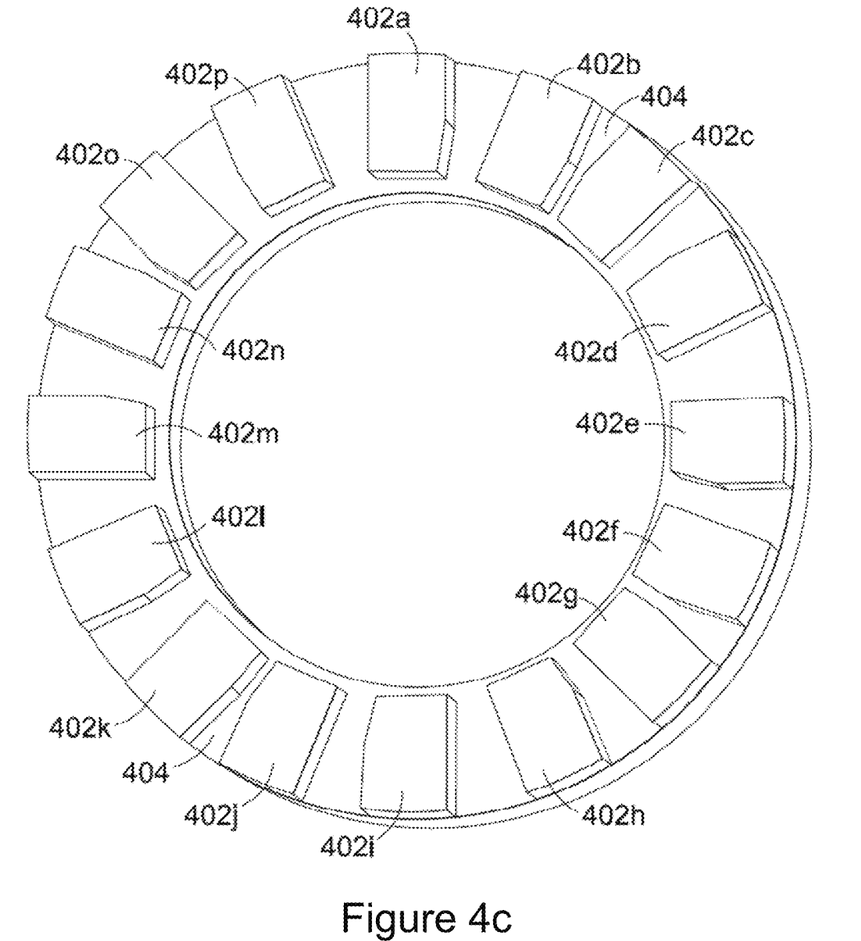

FIG. 4c shows a schematic illustration of the magnet placement in a finished rotor design, according to an embodiment of the invention.

A preferred approach has been described, in which magnets are displaced in adjacent pairs. This is particularly suitable for a 3:2 ratio of stator poles to rotor magnets, since the magnets and pole pieces can then be grouped so that two magnets pair up with three pole pieces, in successive groups in a circumferential direction. However it is not essential that magnets be displaced together in pairs.

Further, in a 3:2 ratio machine when driven by (or generating) a 3-phase power supply each of the three pole pieces in a group may be connected to a different respective phase. This simplifies electrical connections within the machine thus saving space and weight and increasing overall efficiency.

Although it has been discovered that 4-fold symmetry is particularly useful, in principle lower symmetries, for example 3-fold symmetry or even 2-fold symmetry may be employed. However 2-fold symmetry has disadvantages, as described later.

It is generally desirable to maintain the shape of the back emf in a motor (or the shape of the supplied current or voltage in a generator), as nearly sinusoidal as possible. To assist in this, in the stator at least some of the windings of a particular phase are preferably connected in series with one another so that the back emfs sum. The additional degrees of freedom provided by displacement of the rotor magnet positions can be employed to minimise harmonics in the back emf.

As illustrated in FIG. 1, it is generally preferable to use a pair of rotors driven by a common stator. In the context of such an arrangement the cogging can be reduced still further by twisting one rotor relative to the other, for example by around 3°. Where, however, such an approach is employed it is preferable that each rotor has greater than 2-fold symmetry.

This can be understood by considering the example of a 12/10 (pole/magnet) motor in which the poles are separated by 30° and the magnets by 36°. A relative rotation of the rotor with respect to the stator of 6° adds up to a 30° displacement in magnetic position as one travels circumferentially around the rotor by half a turn (5 magnets). The effect of this is to bend each rotor into a hyperbolic parabaloid shape. This shape rotates faster than the rotor itself, for example around an order of magnitude faster in a 12/10 motor.

Although the forces are generally relatively small, it is possible for such an arrangement to resonate. This occurs at a rotational speed which depends on, among other things, the rotor shaft stiffness. At resonance the motor may be subject to very severe stresses. This example serves to illustrate the problem; in practice the resonance may be more complex as in a 3-phase motor the effective speed of rotation may be different to the physical speed of rotation of the rotor—there may be multiple electric revolutions for each physical revolution of the rotor. An analysis of the problem reveals, however, that such 'hyperbolic parabaloid' resonances can be avoided if the rotor has greater than 2-fold symmetry in a dual-rotor machine.

There can be significant losses in an axial flux motor due to eddy currents and hysteresis, for example in the stator bars and/or shoes as well as in the backplate on which the rotor magnets are mounted. It is generally desirable to reduce these losses, not only for greater efficiency, but also to reduce internal heating—cooling is as significant problem for axial flux motors. Eddy currents and hysteresis losses can be reduced in the stator bars by fabricating the stator bars and/or shoes from soft magnetic composite (SMC) or laminated material. However there are conflicting requirements for the rotor: the backplate on which the magnets are mounted should be fabricated from a magnetic material to provide a low reluctance flux path through the machine, as illustrated for example in FIG. 1b. (Here a "magnetic material" refers to a material which has an inherent, polarisable magnetic moment which but the phrase does not necessarily imply that the material is, in itself, a magnet).

Figure 5:
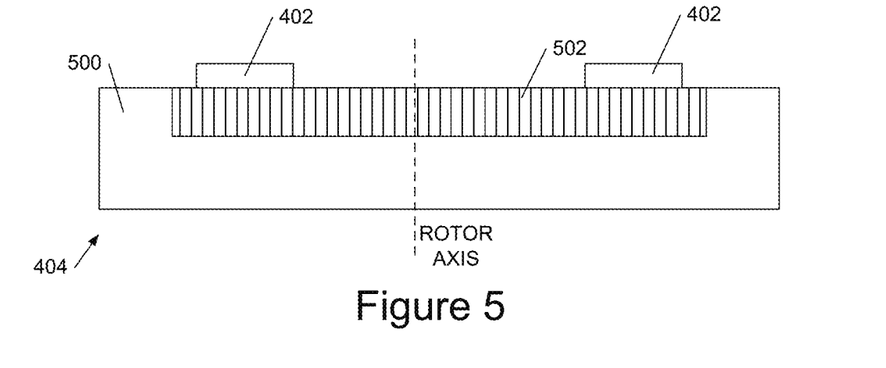
FIG. 5 shows a cross-section through an axial flux motor rotor backplate according to an embodiment of the invention.

In principle fabricating the backplate from SMC or laminating the backplate should reduce eddy currents, but in practice the backplate is then mechanically weak, which is a problem for the very high forces which can be encountered in an axial flux motor. A solution to this problem has been found by embedding a laminated (or SMC) region in a cavity of a metal support, preferably also of magnetic material. FIG. 5 shows an example of such an arrangement in which a steel backplate 500 is provided with a cavity in which laminated material 502 is fastened, for example, by welding, gluing or the like. As illustrated, preferably the lamellae of the laminated structure have their surfaces lying substantially parallel to an axis of rotation of the rotor. Preferably the magnets 402 are mounted on the laminated region of the rotor, although this is not essential. In principle in an alternative, less preferred arrangement, the laminated region 502 may be mounted on the support 500 rather than within a cavity in the support 500.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A rotor for a 3-phase axial flux permanent magnet machine, the machine having a stator comprising a stator housing enclosing a set of coils wound on stator bars or teeth and disposed circumferentially at intervals about a rotational axis of the machine, and a rotor bearing a set of permanent magnets and mounted for rotation about the said axis, and wherein said rotor and stator are spaced apart along said axis to define a gap therebetween in which magnet flux in the machine is generally in an axial direction, wherein said magnets are disposed circumferentially around said rotor, wherein each magnet disposed on the rotor is a magnetic rotor pole and there are a different number of magnetic rotor poles to magnetic stator poles, wherein said magnetic rotor poles are grouped into a plurality, n (a positive integer), of matching sets of magnetic rotor poles, wherein each set of magnetic rotor poles includes two or more magnetic rotor poles and each set of magnetic rotor poles has the same number of magnetic rotor poles as the other sets, wherein all of the magnetic rotor poles in a particular set of magnetic rotor poles are equally spaced from the axis in a radial direction, wherein said n sets of magnetic rotor poles on said rotor have n-fold rotational symmetry, wherein regularly spaced circumferential positions of the magnetic rotor poles are 360/N degrees, N being a positive integer of the number of magnetic rotor poles that are equally radially spaced from the axis, and within each of said sets, at least one of the magnetic rotor poles is displaced circumferentially away from the magnetic rotor pole's regularly spaced circumferential position.

2. The rotor for a 3-phase axial flux permanent magnet machine, as claimed in claim 1, wherein within each said set, relative angular positions of pairs of magnetic rotor poles about an axis of said rotor are displaced in opposite directions at regularly spaced positions.

3. A 3-phase axial flux permanent magnet machine as claimed in claim 1 wherein within one or more of said sets, all the magnetic rotor poles have substantially the same shape.

4. The 3-phase axial flux permanent magnet machine as claimed in claim 1 wherein within one or more of said sets, all the magnetic rotor poles have different shapes.

5. The rotor for a 3-phase axial flux permanent magnet machine as claimed in claim 1 wherein n>2.

6. The rotor for a 3-phase axial flux permanent magnet machine as claimed in claim 5 wherein n=4.

7. A 3-phase axial flux permanent magnet machine including the rotor of claim 1.

8. A 3-phase axial flux permanent magnet machine as claimed in claim 7 wherein a ratio of a number of poles of said machine to a number of said magnetic rotor poles of said machine is 3:2, wherein said number of poles is defined by a number of said stator coils.

9. A 3-phase axial flux permanent magnet machine as claimed in claim 7 comprising two of said rotor, each with corresponding matching sets of magnetic rotor poles and each driven by said stator, wherein one of said rotors is twisted with respect to the other.

10. The 3-phase axial flux permanent magnet machine as claimed in claim 9 wherein a ratio of a number of poles of said machine to a number of said magnetic rotor poles of said machine is 3:2, wherein said number of poles is defined by a number of said stator coils.

11. A method of reducing cogging in a 3-phase axial flux permanent magnet machine, the method comprising employing a rotor with N magnetic rotor poles that are equally radially spaced from a rotational axis of the rotor, wherein the N magnetic rotor poles have a n-fold rotational symmetry (where N and n are positive integers), wherein regularly spaced circumferential positions of the magnetic rotor poles are 360/N degrees, each of n symmetric segments of the rotor comprise a plurality of the magnetic rotor poles and each segment has the same number of magnetic rotor poles as the other segments, the magnetic rotor poles in each segment being equally radially spaced from the rotational axis of the rotor, and within each of n symmetric segments of the rotor, at least one of the magnetic rotor poles is displaced circumferentially away from the magnetic rotor pole's regularly spaced circumferential position, wherein there are a different number of magnetic rotor poles to magnetic stator poles of the machine.

12. The method as claimed in claim 11 wherein n>2.

13. The method as claimed in claim 12 wherein n=4 and a ratio of stator poles to magnetic rotor poles of said machine is 3:2.

14. The method as claimed in claim 12, employing two said rotors driven by a common stator, the method further comprising twisting one of said rotors with respect to the other by a twist in the range 1° to 20°.

15. The method as claimed in claim 14, wherein the method further comprising twisting one of said rotors with respect to the other by a twist in the range 1° to 10°.

16. A method of shaping back emf in a 3-phase axial flux permanent magnet machine, the method comprising employing a rotor with N magnetic rotor poles that are equally spaced from a rotational axis of the rotor in a radial direction, wherein the N magnets have a n-fold rotational symmetry (where N and n are positive integers) and, N being a positive integer of the number of magnetic rotor poles that are equally radially spaced from the axis, the machine having a stator comprising a stator housing enclosing a set of coils wound on stator bars or teeth and disposed circumferentially at intervals about an axis of the machine, wherein regularly spaced circumferential positions of the magnetic rotor poles are 360/N degrees, each of n symmetric segments of the rotor comprise a plurality of the magnetic rotor poles and each segment of magnetic rotor poles has the same number of magnetic rotor poles as the other segments, all of the magnetic rotor poles in each segment being equally spaced from the rotational axis of the rotor in a radial direction, and within each of n symmetric segments of the rotor, at least one of the magnetic rotor poles is displaced circumferentially away from the magnetic rotor pole's regularly spaced circumferential position, wherein there are a different number of magnetic rotor poles to magnetic stator poles of the machine.

\* \* \* \* \*